(12) United States Patent
Hoff

(10) Patent No.: US 6,176,541 B1
(45) Date of Patent: Jan. 23, 2001

(54) TRUCK BED COVER

(76) Inventor: Stuart D. Hoff, 6743 Starr St., Lincoln, NE (US) 68505

(*) Notice: Under 35 U.S.C. 154(b), the term of this patent shall be extended for 0 days.

(21) Appl. No.: 09/264,776

(22) Filed: Mar. 9, 1999

Related U.S. Application Data (60) Provisional application No. 60/106,172, filed on Oct. 29, 1998.

(51) Int. Cl.$^7$ .......................................... B60P 7/02
(52) U.S. Cl. .................. 296/100.09; 296/100.03; 296/39.2
(58) Field of Search .................. 296/10, 37.5, 37.6, 296/39.2, 100.02, 100.03, 100.06, 100.04, 100.05, 100.09

(56) References Cited

U.S. PATENT DOCUMENTS

| | | | | |
|---|---|---|---|---|
| 5,251,950 | * | 10/1993 | Bernardo | 296/98 |
| 5,931,521 | * | 8/1999 | Kooiker | 296/100.09 |
| 5,961,173 | * | 10/1999 | Repetti | 296/37.6 |
| 5,979,963 | * | 11/1999 | Jordon | 296/37.6 |
| 6,039,379 | * | 3/2000 | Jordan | 296/37.6 |
| 6,053,557 | * | 4/2000 | Kooiker | 296/100.06 |
| 6,059,350 | * | 5/2000 | Kooiker | 296/100.09 |

* cited by examiner

*Primary Examiner*—D. Glenn Dayoan
*Assistant Examiner*—Patricia Engle
(74) *Attorney, Agent, or Firm*—Koley Jessen P.C.; Mark D. Frederiksen (57) ABSTRACT

A truck bed cover includes a pair of channels, each channel having an inwardly directed and outwardly directed receiving channel there along, slidably engaged on inwardly directed flanges of the side panels of the truck bed. At least one cover panel is then slid forwardly between the inwardly directed receiving channels of the channels on the flanges to cover the truck bed. A connector member which extends between the channels is utilized to interconnect cover panels on the truck bed. In trucks having a trapezoidal shaped bed, the channels have openings formed in upper portions of the forward ends thereof, and trapezoidal shaped cover panels are dropped through the opening and then slid rearwardly into engagement with a connector on the rearward most panel.

9 Claims, 7 Drawing Sheets

TRUCK BED COVER

CROSS-REFERENCES TO RELATED APPLICATIONS

This application claims the benefit of U.S. Provisional application Ser. No. 60/106,172, filed Oct. 29, 1998.

BACKGROUND OF THE INVENTION (1) Field of the Invention

The present invention relates generally to covers for the beds of pickup trucks, and more particularly to an improved hard cover which may be quickly and easily attached and removed from a truck bed without the use of tools or fasteners.

(2) Background Information

Covers for truck beds have been manufactured for many years, but still suffer several problems. The most basic problem is the requirement of tools and fasteners to install the cover onto the truck panels. In most cases, prior art truck bed covers are bolted into the panels, thereby leaving permanent holes in the truck if the fasteners are ever removed.

Another problem with prior art truck bed covers is in the time and effort required to attach or remove the cover from the truck. Typically, power tools are required for this endeavor and in most cases it takes hours to initially install the cover, or permanently remove the cover.

BRIEF SUMMARY OF THE INVENTION

It is therefore a general object of the present invention to provide an improved truck bed cover for pickup trucks.

Another object is to provide a truck bed cover and attachment system which may be quickly and easily installed and removed from the pickup truck without the use of tools.

Still another object of the present invention is to provide an improved truck bed cover which does not utilize fasteners bolted into the truck, to thereby permit complete removal of the cover from the truck without damage to the truck itself.

These and other objects will be apparent to those skilled in the art.

The truck bed cover of the present invention includes a pair of channels, each channel having an inwardly directed and outwardly directed receiving channel there along, slidably engaged on inwardly directed flanges of the side panels of the truck bed. At least one cover panel is then slid forwardly between the inwardly directed receiving channels of the channels on the flanges to cover the truck bed. A connector member which extends between the channels is utilized to interconnect cover panels on the truck bed. In trucks having a trapezoidal shaped bed, the channels have openings formed in upper portions of the forward ends thereof, and trapezoidal shaped cover panels are dropped through the opening and then slid rearwardly into engagement with a connector on the rearward most panel.

BRIEF DESCRIPTION OF THE SEVERAL VIEWS OF THE DRAWING

Several embodiments of this invention are illustrated in the accompanying drawing, in which similar or corresponding parts are identified with the same reference numeral throughout the several views, and in which.

DETAILED DESCRIPTION OF THE INVENTION

Figure 1:
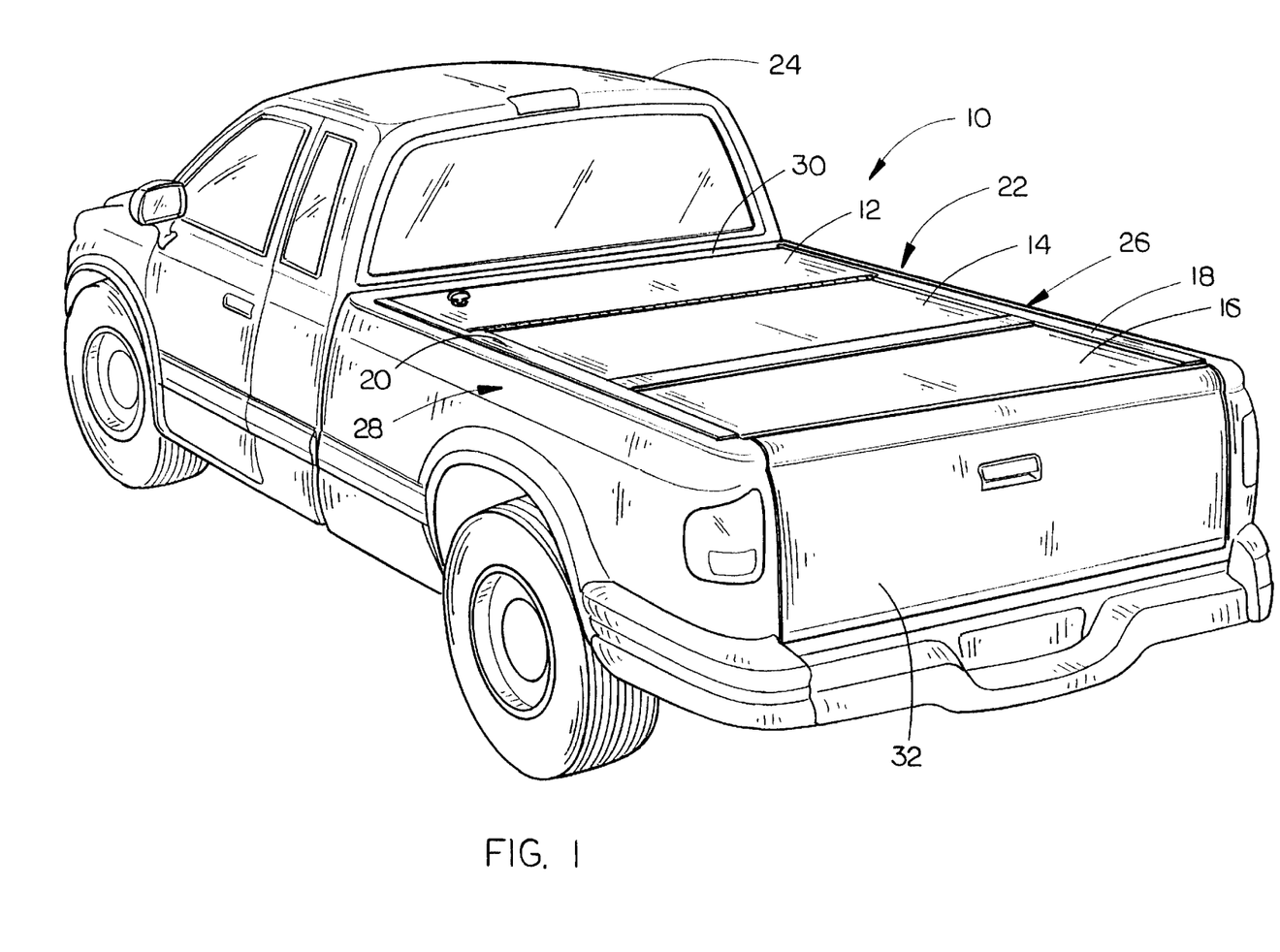
FIG. 1 is a perspective view of the truck bed cover of the present invention installed on a truck.

Referring now to the drawings, and more particularly to FIG. 1, the truck bed cover of the present invention is designated generally at 10 and includes a plurality of rigid panels 12, 14, and 16 slidably mounted between a pair of channels 18 and 20 to form a rigid cover over the bed 22 of a truck 24. Truck bed cover 10 is mounted between the upper edges of the bed side panels 26 and 28, and between the forward panel 30 and tailgate 32 of the bed 22.

Figure 2:
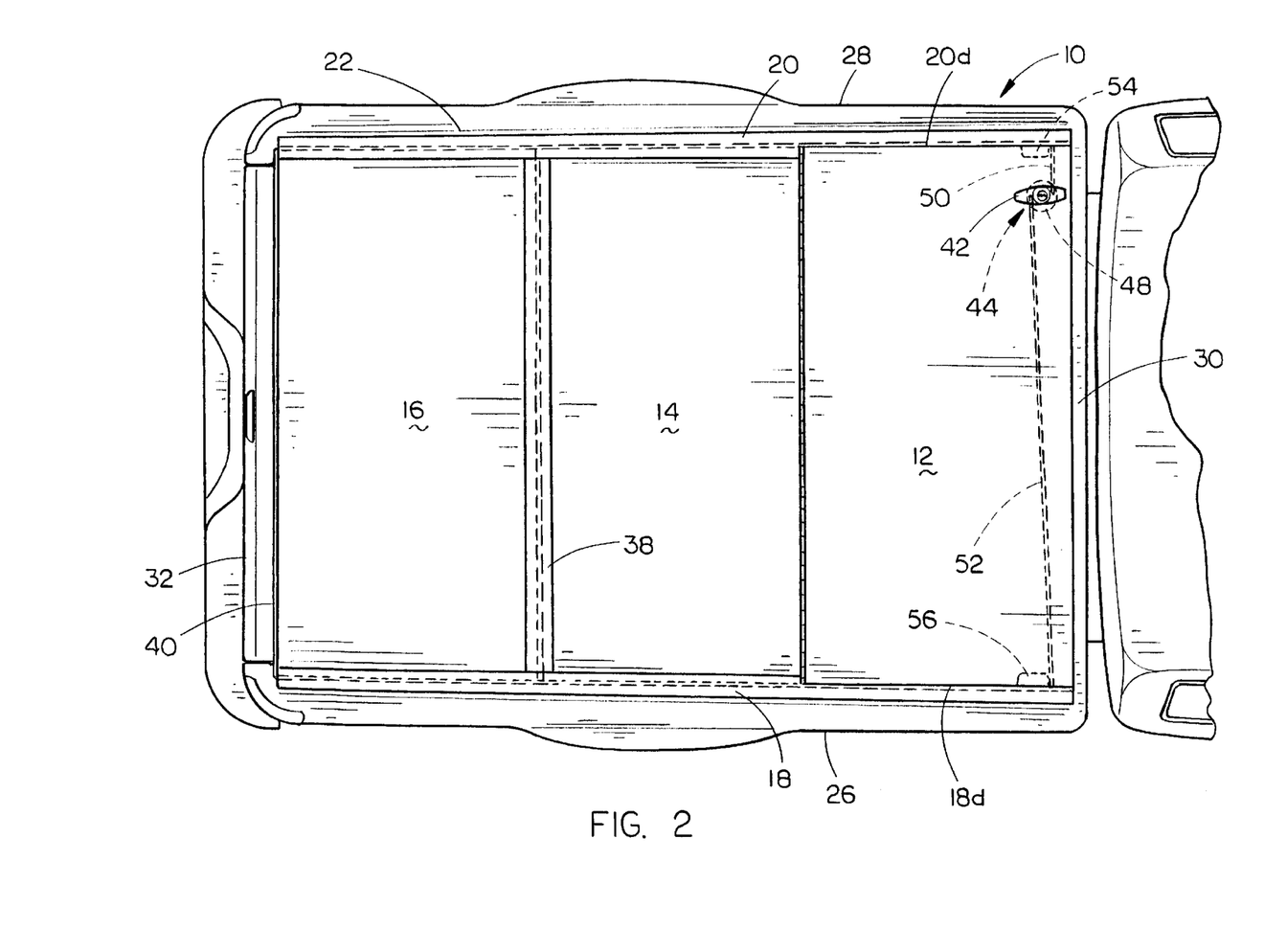
FIG. 2 is a top plan view of a truck with the truck bed cover thereon.

Referring now to FIG. 2, pickup truck beds 22 typically come in several configurations, most common, rectangular and trapezoidal. Some newer truck models have a width at the forward end of the bed 22 which is wider than the rearward end of the bed, with the width gradually tapering from the forward end to the rearward end. This configuration is shown in FIG. 2. Panels 12, 14, and 16 are retained in position on truck bed 22 by channels 18 and 20 mounted on the upper edges of side panels 26 and 28 respectively. Channels 18 and 20 extend continuously from tailgate 32 to forward panel 30.

Figure 3:
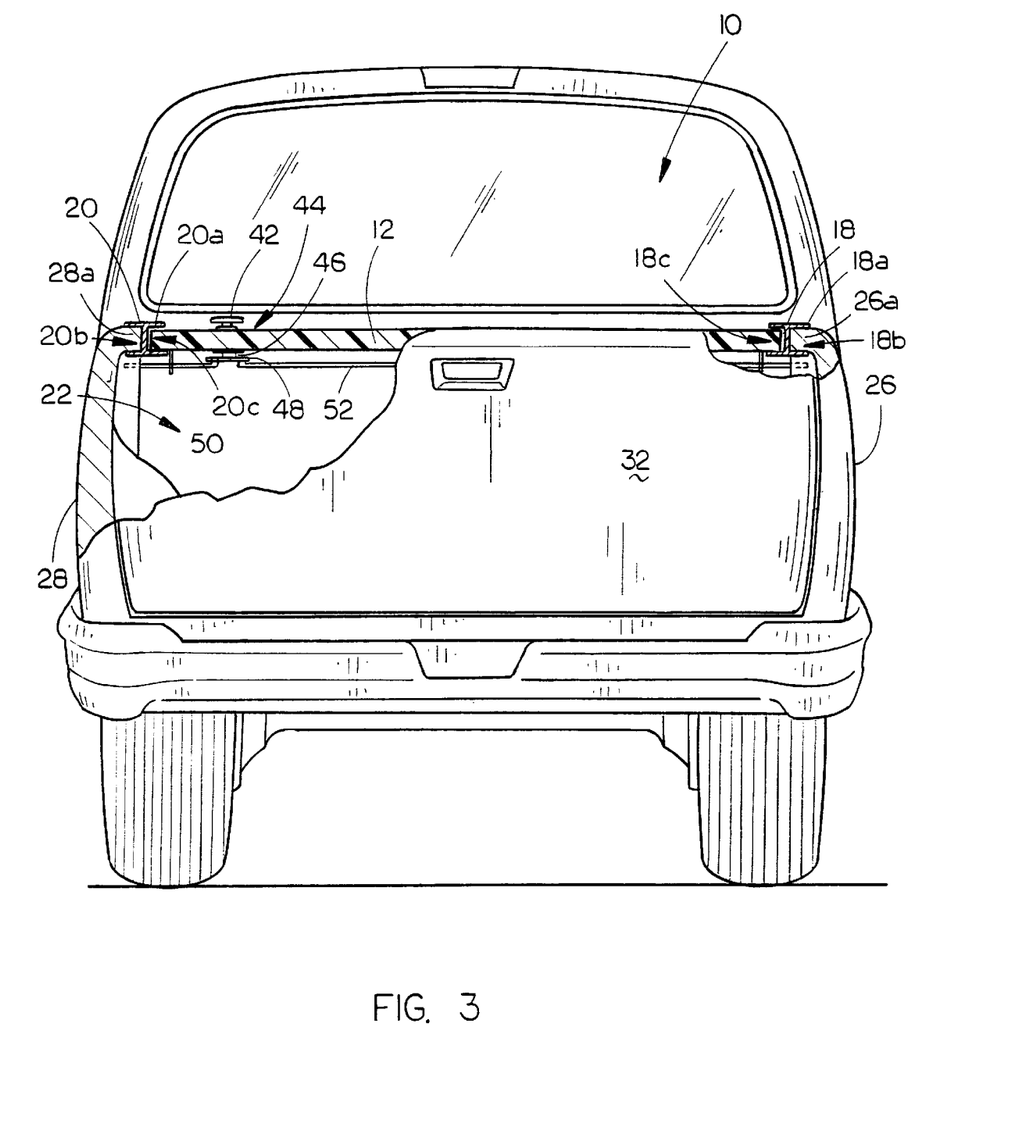
FIG. 3 is a rear elevational view of a truck with the truck bed cover thereon, with portions shown in section to more clearly show detail of the truck bed cover.

As shown in FIG. 3, the upper edge of each truck bed side panel 26 and 28 has a horizontally oriented inwardly directed flange 26a and 28a respectively. Each channel 18 and 20 is generally I-shaped in cross-section, with a central web 18a and 20a respectively forming the back of opposing outward and inward receiver channels 18b and 18c respectively, and 20b and 20c respectively. The outward receiver channels 18b and 20b will snugly grip the panel flanges 26a and 28a respectively, while inward channels 18c and 20c will slidably receive the side edges of panels 12, 14, and 16 therebetween. Weather stripping or similar material may be applied within outward receiving channels 18b and 20b to prevent scratches or marring of the panel flanges 26a and 28a upon mounting of channels 18 and 20 thereon.

Figure 5:
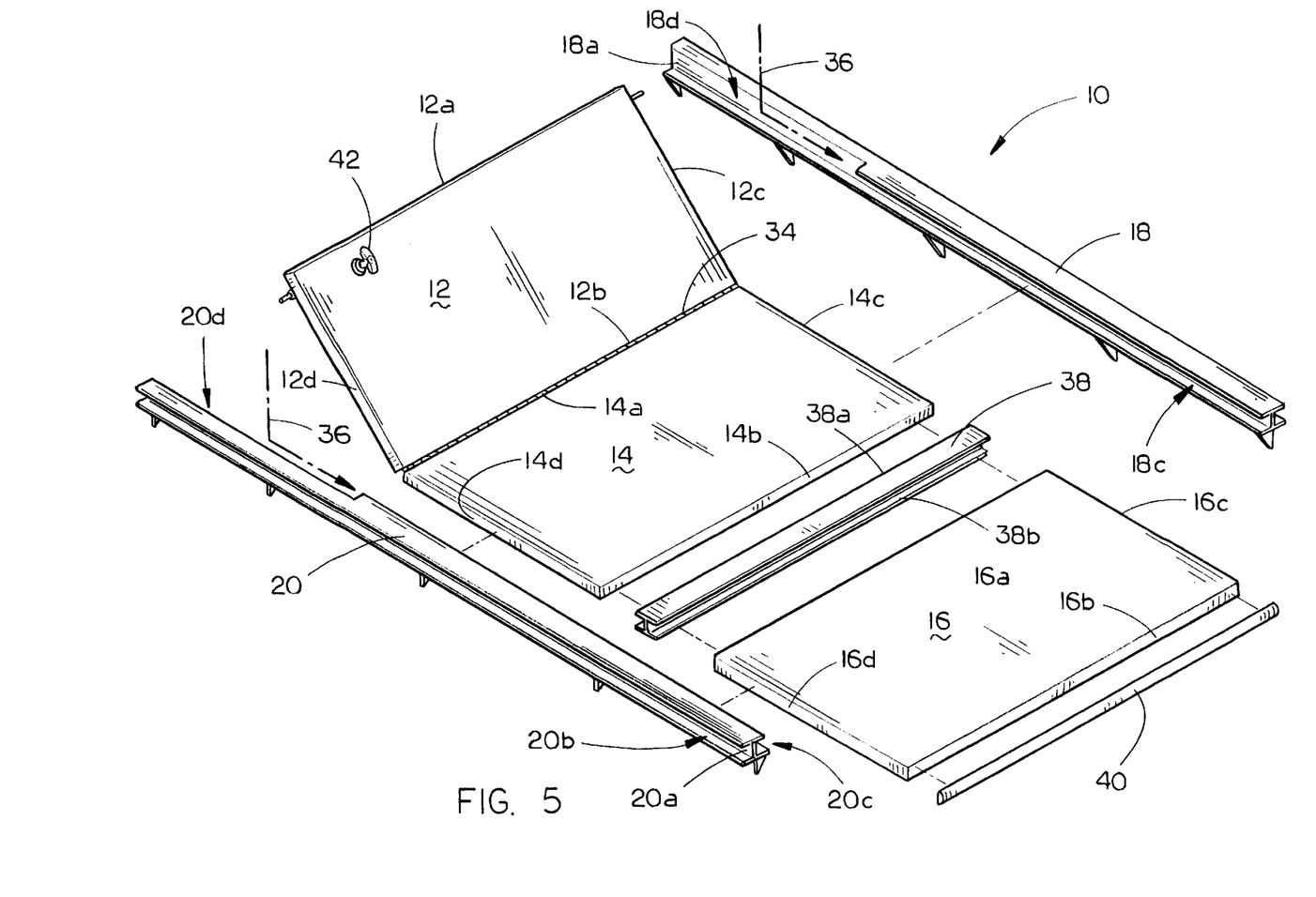
FIG. 5 is an exploded perspective view of the truck bed cover.

Referring now to FIG. 5, panels 12, 14, and 16 are preferably formed of PVC or similar material, and may include a hollow box-like interior to reduce weight. Forward panel 12 includes forward and rearward edges 12a and 12b, and opposing side edges 12c and 12d, tapering gradually from a greater width at forward edge 12a to a narrower width at rearward edge 12b, to thereby form a trapezoidal shape.

Figure 4:
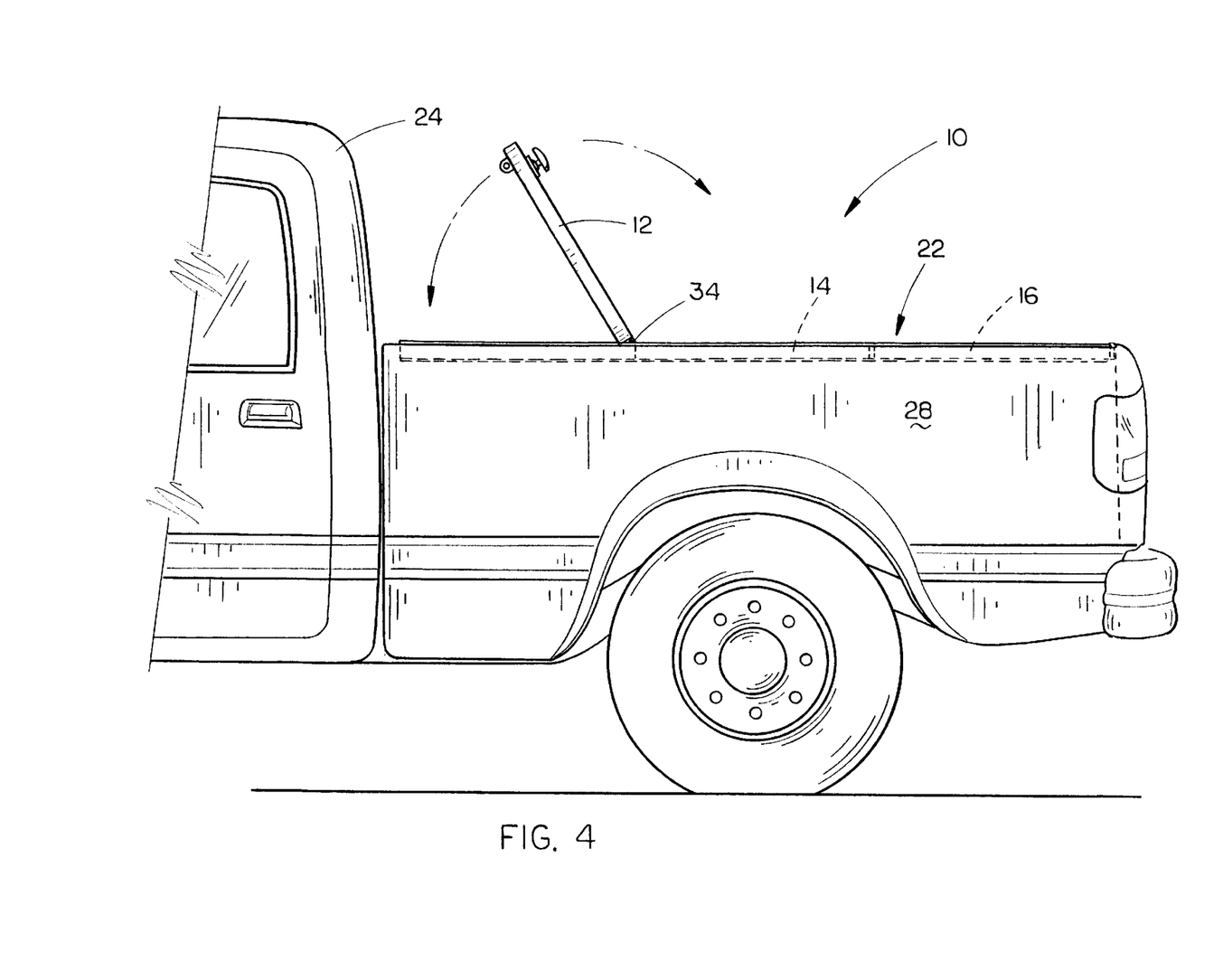
FIG. 4 is a side elevational view of the truck with an operable door of the cover moved to an open position.

Panel 14 is also trapezoidal in shape with parallel forward and rearward edges 14a and 14b, and tapered side edges 14c and 14d. The rearward edge 12b of forward panel 12 is pivotally connected to the forward edge 14a of panel 14, with a hinge 34. Hinge 34 permits panel 12 to act as a pivotable door, which may be opened to access the interior of the truck bed, once cover 10 is installed, as shown in FIG. 4.

Referring once again to FIG. 5, it can be seen that a portion of the upper legs of each inward receiving channel 18c and 20c are cut away at the forward end of channels 18 and 20, to permit the pivotal movement of forward panel 12 upwardly out of the inward receiving channels 18c and 20c. This opening at the forward end of channels 18 and 20 is designated generally at 18d and 20d in FIG. 5, and is a length substantially equal to the lengths of forward and middle panels 12 and 14, as measured between their forward and rearward edges.

Because of the trapezoidal shape of the truck bed, the width of forward and middle panels 12 and 14 is greater than the distance between the rearward ends of channels 18 and 20, thereby preventing slidable installation of forward and middle panels 12 and 14 from the rearward end. Openings 18d and 20d in the fore ends of channels 18 and 20 permit installation of panels 12 and 14, as follows. Initially, panel 12 is pivoted to an "open" position stacked on top of panel 14. The length of openings 18d and 20d then permits middle panel 14 to be lowered downwardly into inward receiving channels 18c and 18d, as shown by arrows 36. The combination of panels 12 and 14 may then be slid rearwardly with panel 14 journaled within inward receiving channels 18c and 20c, and panel 12 sliding on top of channels 18 and 20. Once hinge 34 contacts the rearward end of openings 18d and 20d, forward panel 12 may be pivoted to a closed position.

A transverse connecting channel 38 has a generally I-shaped cross-section, to form a forward receiving channel 38a and a rearward receiving channel 38b. Connecting channel 38 has a length which permits slidable insertion between the rearward ends of channels 18 and 20. Connecting channel 38 is then slid forwardly within channels 18 and 20 until the forward receiving channel 38a engages the rearward edge 14b of middle panel 14. Rectangular shaped rearward panel 16 is then slid forwardly into channels 18 and 20 into engagement within rearward receiving channel 38b of connecting channel 38. A weather strip, or compressible seal 40 may then be mounted between channels 18 and 20 rearwardly of rearward panel 16, so as to engage the tailgate 32, as shown in FIG. 2.

Referring once again to FIGS. 2 and 3, forward panel 12 has a handle 42 thereon to permit the consumer to pivot forward panel 12 between the open and closed positions. Preferably, handle 42 is connected to a lock mechanism 44 to permit the forward panel 12 to be locked in a closed position. Lock mechanism 44 includes a lock cylinder 46 extending through panel 12 to the lower face thereof, and connected to a link 48. Link 48 has a pair of opposingly extending arms 50 and 52, pivotally connected to each end of link 48. Rotation of the lock in lock cylinder 46 will rotate link 48 and extend arms 50 and 52 into the space between the forward stake pockets 54 and 56 and the truck bed forward panel 30. This will prevent rearward movement of panels 12 and 14 in channels 18 and 20. In addition, the ends of arms 50 and 52 will extend under channels 18 and 20 and the side panel flanges 26a and 28a, to prevent opening of forward panel 12.

It can be seen that cover 10 may be quickly and easily installed on the bed of a pickup truck without bolting any portion of the cover 10 to the truck itself. In addition, because of the pivotal connection of front panel 12 to middle panel 14, the consumer may access the forward end of the pickup bed without removing either the middle or rearward panels 14 and 16.

Figure 6:
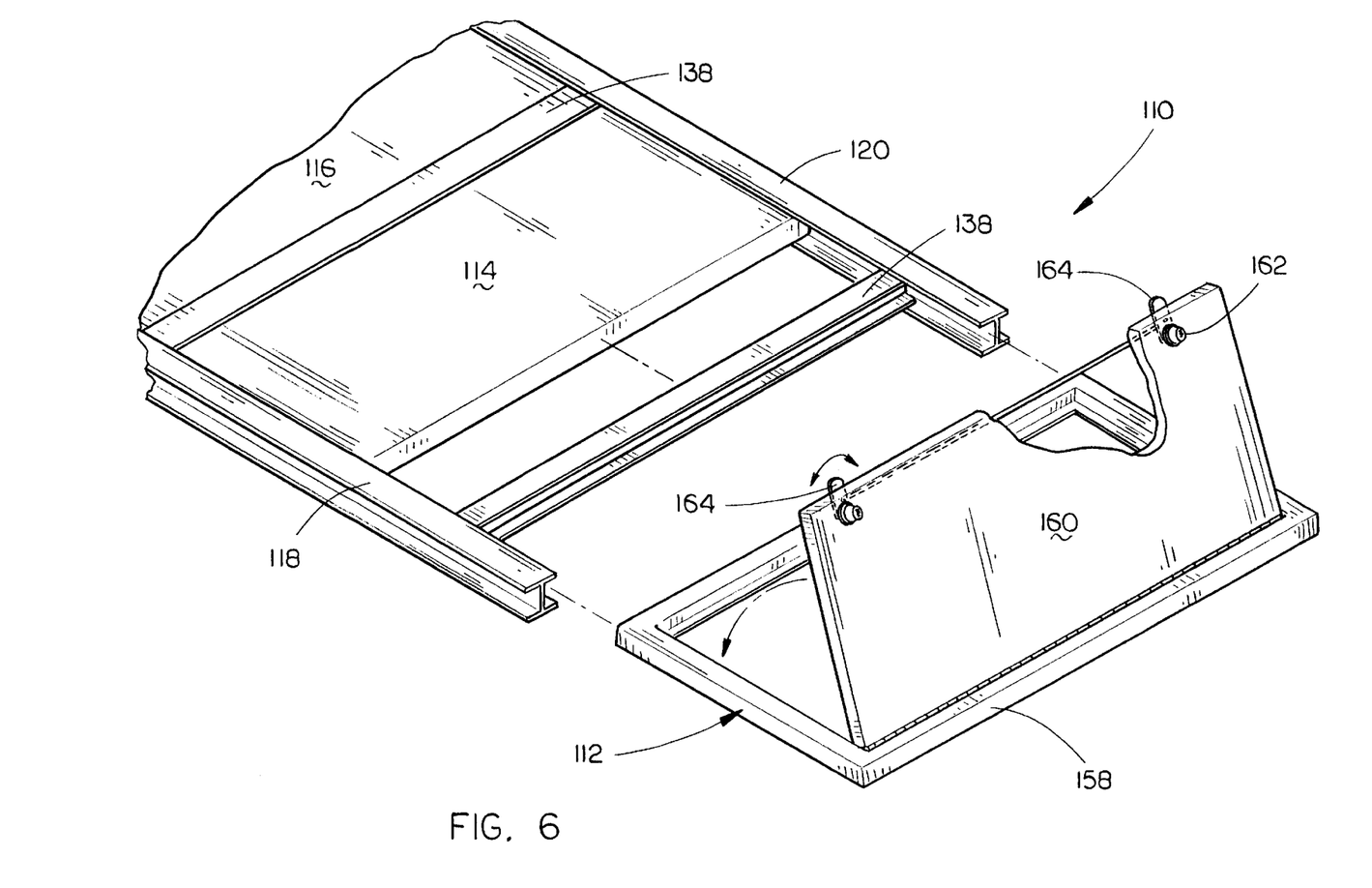
FIG. 6 is an exploded perspective view of a second embodiment of the invention.

Referring now to FIG. 6, a second embodiment of the truck bed cover is designated generally at 110, and is designed for uses on trucks having a rectangular truck bed, rather than the trapezoidal truck bed of the first embodiment. Because the truck bed is rectangular, the distance between channels 118 and 120 will be equal along their entire length. This in turn permits each panel 112, 114, and 116 to slide into position from the rearward ends of channels 118 and 120.

The forward panel 112 of truck bed cover 110 is preferably formed with a rectangular frame 158 with a door 160 pivotally mounted therein. A lock mechanism 162 is operable to selectively lock the door closed, by movement of a pair of tabs 164 under frame 158.

A second transverse connecting channel 138, with a generally I-shaped cross-section, interconnects the forward end middle panels 112 and 114, in the same fashion as the other connecting channel interconnects middle panel 114 with rearward panel 116.

Figure 7:
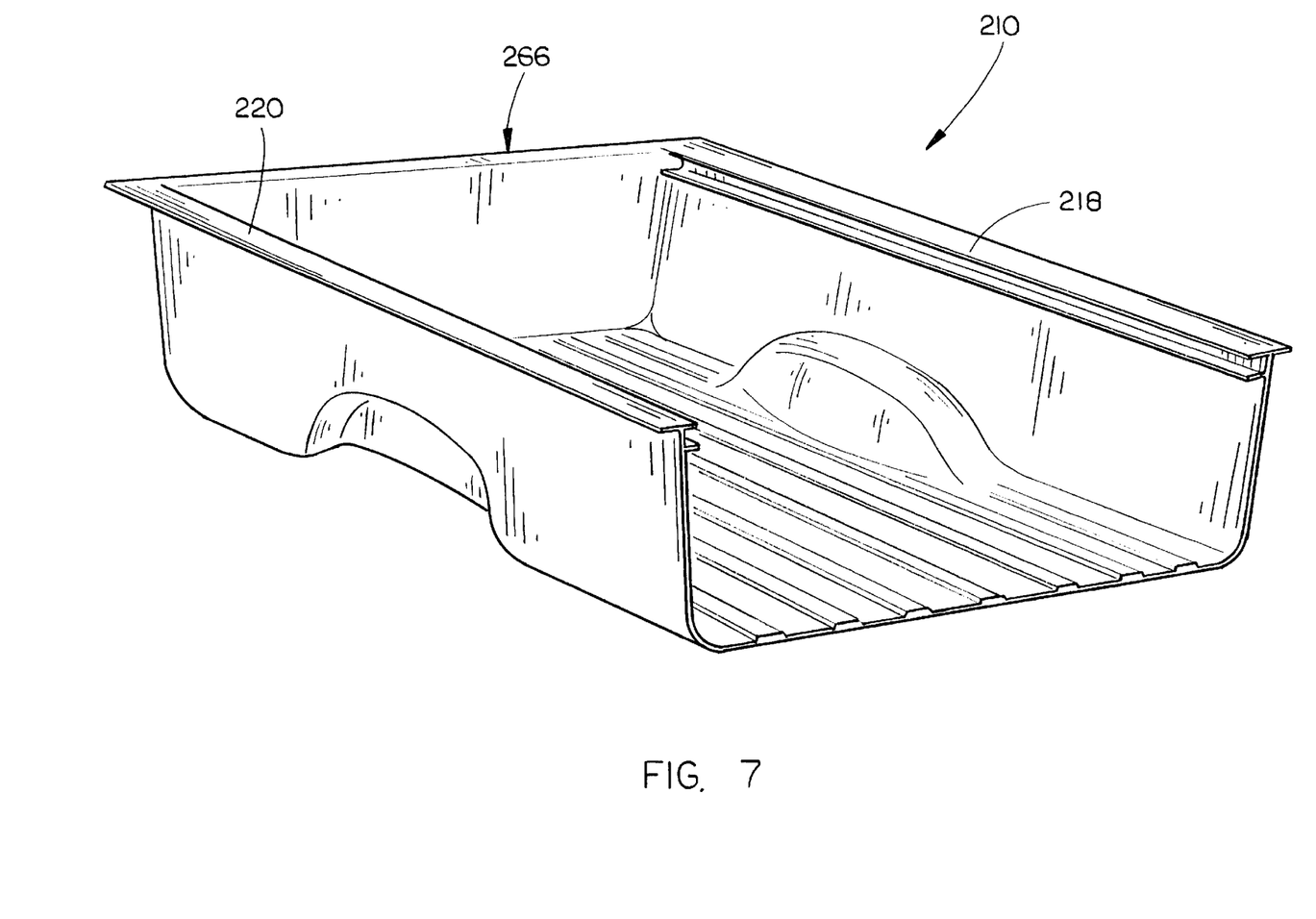
FIG. 7 is a perspective view of a third embodiment of the invention.

Referring now to FIG. 7, a third embodiment of the invention is designated generally at 210, and differs from the second embodiment 110, shown in FIG. 6, only in the use of channels 218 and 220 which are formed integrally with a bed liner 266. The panels 112, 114, and 116, and connecting channels 138, of the second embodiment 110 would be identical, and could be installed within channels 218 and 220 of bed cover 210 in the same fashion as with the second embodiment.

Whereas the invention has been shown and described in connection with the preferred embodiments thereof, many modifications, substitutions and additions may be made which are within the intended broad scope of the appended claims.

I claim:

1. In combination:

a truck of the type having a pair of first and second opposing vertical side panels with inwardly directed flanges along upper edges thereof, a forward vertical panel and a vertical tailgate defining the truck bed; and a cover for the truck bed, the cover comprising:

a first channel having a length substantially equal to the first side panel and having means for removably connecting the first channel to the flange of the first side panel;

a second channel having a length substantially equal to the second side panel and having means for removably connecting the second channel to the flange of the second side panel;

said first and second channels each having an inwardly directed receiving channel formed along the lengths thereof, said receiving channels oriented generally coplanar;

at least first and second cover panels having forward and rearward edges and opposing side edges, said cover panel having a width, measured between the side edges, to fit slidably between the first and second channels;

said second cover panel located forwardly of the first cover panel and coplanar therewith;

a connector juxtaposed between the first and second cover panel to interconnect the cover panels, said connector extending between the first and second channels;

said connector having opposingly-directed channels having a shape and size to receive said first and second panels therein in slidable frictional engagement therewith;

said cover panels extending the length of the side panels to completely cover the truck bed; and said means for removably connecting the first and second channels to the side panel flanges including each said first and second channel having an outwardly directed receiving channel having a shape and size to receive the side panel flange therein in slidable frictional engagement therewith.

2. In combination:
a truck of the type having a pair of first and second opposing vertical side panels with inwardly directed flanges along upper edges thereof, a forward vertical panel and a vertical tailgate defining the truck bed; and
a cover for the truck bed, the cover comprising:
a first channel having a length substantially equal to the first side panel and having means for removably connecting the first channel to the flange of the first side panel;
a second channel having a length substantially equal to the second side panel and having means for removably connecting the second channel to the flange of the second side panel;
said first and second channels each having an inwardly directed receiving channel formed along the lengths thereof, said receiving channels oriented generally coplanar;
at least first and second cover panels having forward and rearward edges and opposing side edges, said cover panel having a width, measured between the side edges, to fit slidably between the first and second channels;
said second cover panel located forwardly of the first cover panel and coplanar therewith;
a first connector juxtaposed between the first and second cover panel to interconnect the cover panels, said first connector extending between the first and second channels;
said first connector having opposingly-directed channels having a shape and size to receive said first and second panels therein in slidable frictional engagement therewith;
said cover panels extending the length of the side panels to completely cover the truck bed,
said second cover panel including an operable door, said door operable between an open position permitting access to the interior of the truck bed, and a closed position generally coplanar with the first cover panel;
a selectively operable lock mechanism mounted in the door, operable between a locked position preventing opening of the door, and an unlocked positioned permitting opening of the door;
said at least first and second cover panels including a third cover panel having forward and rearward edges and opposing side edges, said third panel having a width, measured between the side edges, to fit slidably between the first and second channels;
said third cover panel located between the first and second cover panels and oriented generally coplanar therewith, the rearward edge of the third cover panel in engagement with the first connector;
a second connector juxtaposed between the second and third cover panels to interconnect the second and third cover panels, the second connector extending between first and second channels; and
said means for removably connecting the first and second channels to the side panel flanges including each said first and second channel having an outwardly directed receiving channel having a shape and size to receive the side panel flange therein in slidable frictional engagement therewith.

3. The combination of claim 2, wherein the truck bed is generally rectangular in shape and each cover panel has the same uniform width.

4. In combination:
a truck of the type having a pair of first and second opposing vertical side panels with inwardly directed flanges along upper edges thereof, a forward vertical panel and a vertical tailgate defining the truck bed; and
a cover for the truck bed, the cover comprising:
a first channel having a length substantially equal to the first side panel and having means for removably connecting the first channel to the flange of the first side panel;
a second channel having a length substantially equal to the second side panel and having means for removably connecting the second channel to the flange of the second side panel;
said first and second channels each having an inwardly directed receiving channel formed along the lengths thereof, said receiving channels oriented generally coplanar;
at least first, second and third cover panels having forward and rearward edges and opposing side edges, said cover panel having a width, measured between the side edges, to fit slidably between the first and second channels;
said cover panels extending the length of the side panels to completely cover the truck bed;
said second cover panel located forwardly of the first cover panel and coplanar therewith;
a first connector juxtaposed between the first and second cover panel to interconnect the cover panels, said connector extending between the first and second channels;
said second cover panel including an operable door, said door operable between an open position permitting access to the interior of the truck bed, and a closed position generally coplanar with the first cover panel;
a selectively operable lock mechanism mounted in the door, operable between a locked position preventing opening of the door, and an unlocked positioned permitting opening of the door;
said third cover panel located between the first and second cover panel and oriented generally coplanar therewith, the rearward edge of the third cover panel in engagement with the first connector;
a second connector juxtaposed between the second and third cover panels to interconnect the second and third cover panels, the second connector extending between said first and second channels;
said means for removably connecting the first and second channels to the side panel flanges including each said first and second channel having an outwardly directed receiving channel having a shape and size to receive the side panel flange therein in slidable, frictional engagement therewith;
the distance between the side panels of the truck bed increasing from the tailgate to the front panel to form a generally trapezoidal shape;
the first cover panel being substantially rectangular in shape;
the second and third cover panels being generally trapezoidal in shape with parallel forward and rearward edges and the forward edges being longer than the rearward edges;

said second cover panel rearward edge having a leg substantially the same as the length of the third panel forward edge;

said first and second channels having openings formed in an upper portion thereof of a size to permit the entry of the second and third cover panels into the first and second channels, from above.

5. The combination of claim 4, wherein said channel openings are located a forward end of each of said channels.

6. The combination of claim 5, wherein said second connector is a hinge and wherein said entire second panel forms said door.

7. A method for installing a cover on the bed of a truck, the truck of the type having a pair of first and second opposing vertical side panels with inwardly directed flanges along upper edges, a forward vertical panel and a vertical tailgate defining the truck bed, comprising the steps of:

sliding an outwardly directed receiving channel of a first channel on to the flange of the first side panel;

sliding an outwardly directed receiving channel of a second channel on to the flange of the second side panel;

said outwardly directed receiving channels of a size to slidably frictionally engage the respective flanges;

sliding a cover panel into inwardly directed receiving channels of the first and second channels, the cover panel having a width to extend completely between the first and second channels; and said inwardly directed receiving channels of a size to slidably frictionally engage the cover panel.

8. The method of claim further comprising the steps of:

sliding an elongated connector between the first and second channels into slidable, frictional engagement with the rearward edge of the first panel; and sliding a second cover panel into the inwardly directed receiving channels of the first and second channels, into slidable, frictional engagement with the connector such that the first and second cover panels extend the entire length of the truck bed.

9. A method for installing a cover on the bed of a truck, the truck of the type having a pair of first and second opposing vertical side panels with inwardly directed flanges along upper edges, a forward vertical panel and a vertical tailgate defining the truck bed, said truck bed of the type having forward ends of the side panels spaced apart a distance greater than the rearward ends of the side panels, comprising the steps of:

sliding an outwardly directed receiving channel of a first channel on to the flange of the first side panel;

sliding an outwardly directed receiving channel of a second channel on to the flange of the second side panel;

sliding a cover panel into inwardly directed receiving channels of the first and second channels, the cover panel having a width to extend completely between the first and second channels;

locating the first cover panel at the rearward ends of the first and second channels;

positioning an elongated connector on a forward edge of the first cover panel;

pivotally connecting a rearward edge of a trapezoidal second panel to a forward edge of a trapezoidal third panel, said second and third panels having parallel forward and rearward edges and the forward edges being longer than the rearward edges, with the second panel rearward edge substantially equal in length to the third panel forward edge;

dropping the third cover panel downwardly through openings in upper portions of the forward ends of the first and second channels, with the second panel pivoted atop the third panel;

sliding the third cover panel rearwardly into the inwardly directed channels of the first and second channels with the second panel located upwardly out of the first and second channels, into engagement with the connector and first cover panel; and pivoting the second panel to a closed position through the channel openings and into the first and second channel inwardly directed receiving channels.

* * * * *